United States Patent Office 2,751,067
Patented June 19, 1956

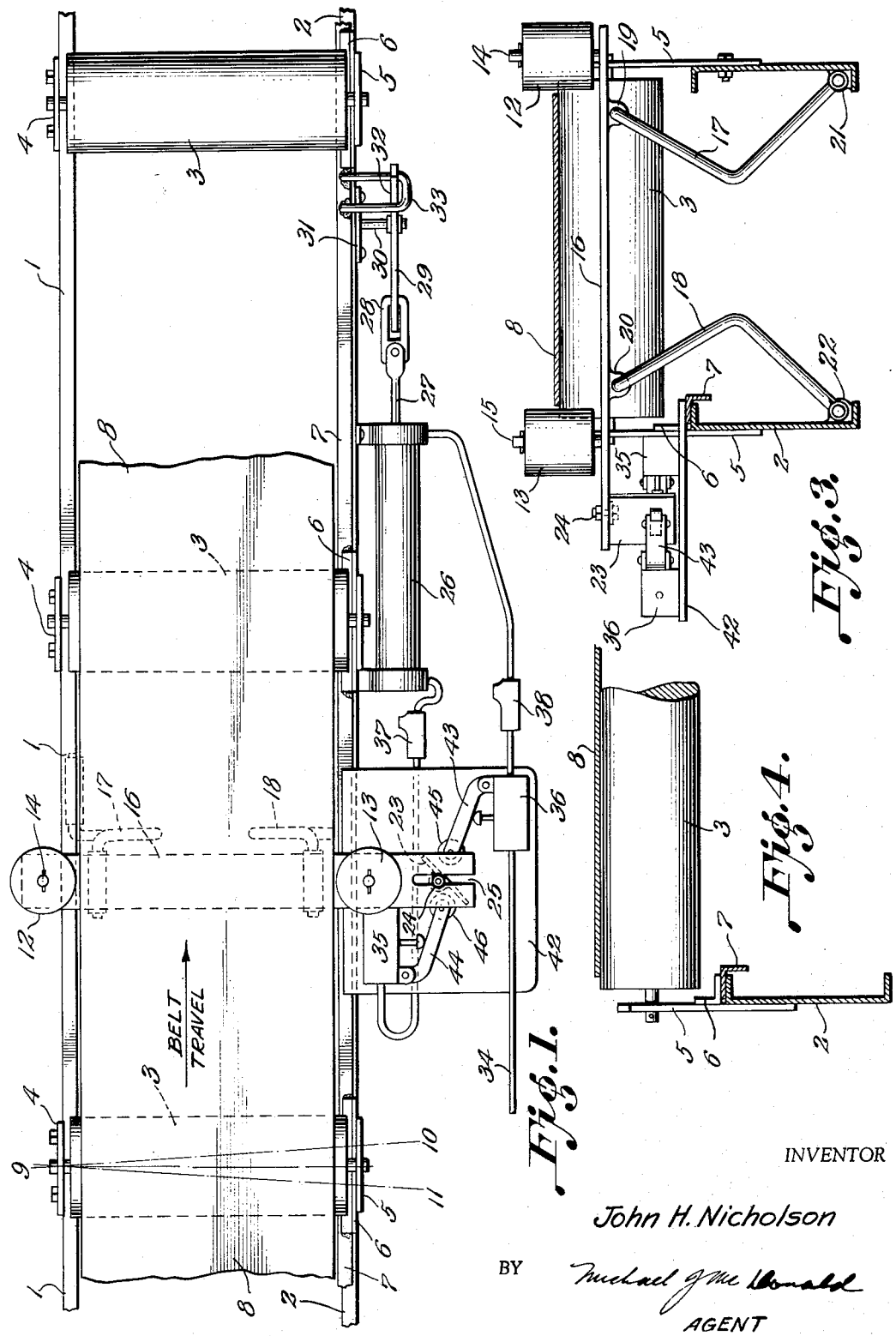

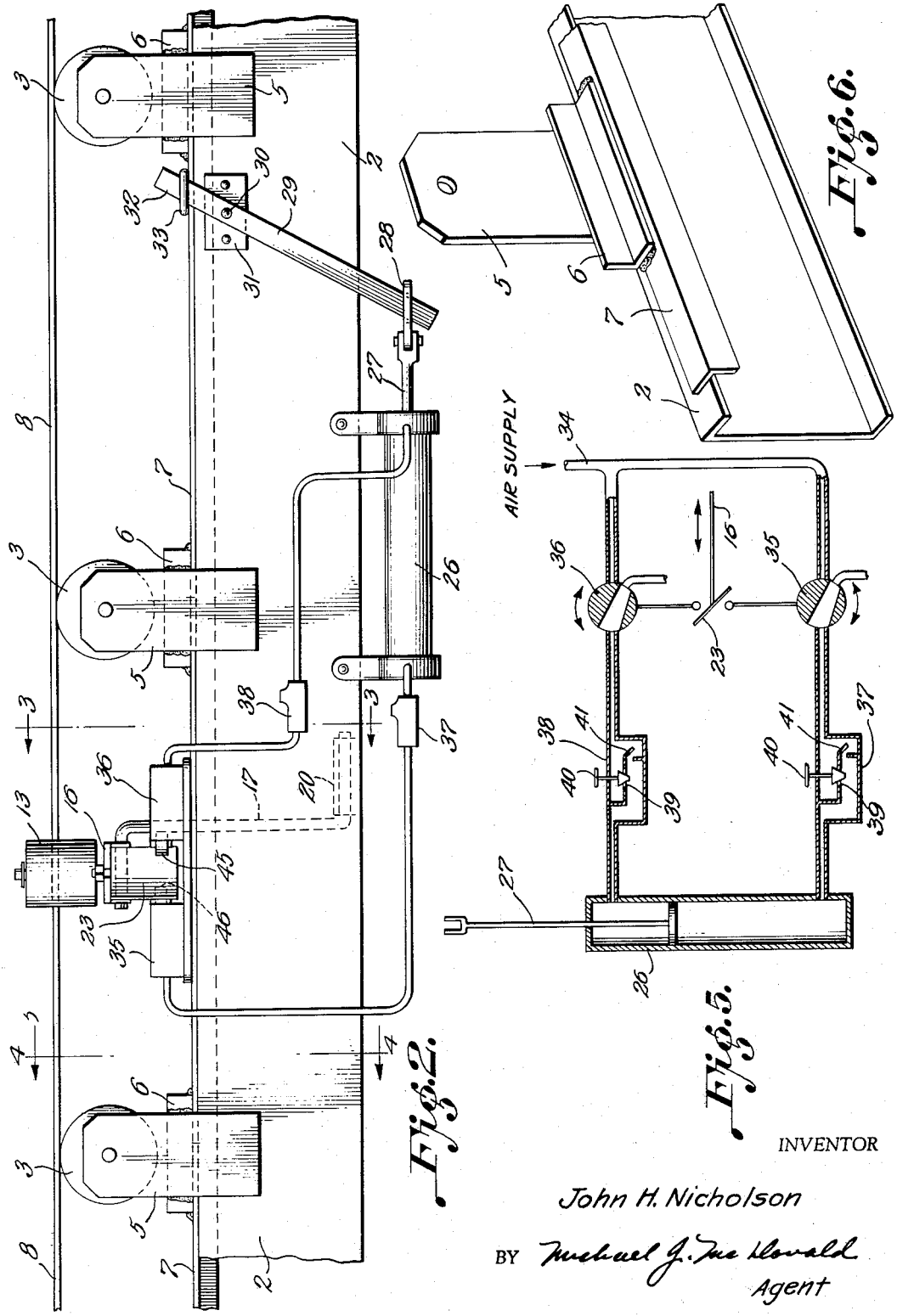

2,751,067

CONVEYOR ALIGNING MECHANISM

John H. Nicholson, Upland, Calif., assignor to Sunkist Growers, Inc., Los Angeles, Calif., a corporation of California Application December 20, 1954, Serial No. 476,180

2 Claims. (Cl. 198—202)

This invention relates to a mechanism for maintaining conveyor belts centered or in proper alignment with their supporting framework.

More particularly this invention relates to a mechanism for returning a conveyor belt to proper alignment when it drifts laterally out of alignment in either direction.

Flat conveyor belts are difficult to maintain in alignment inasmuch as there are many factors tending to disrupt their initial alignment. Stretching or warping of the belt due to temperature changes or wetting, wear and side thrust are some of the factors making alignment difficult. Many devices have been proposed for maintaining conveyor belt alignment but have been generally unsatisfactory, due to the fact that they overcompensate with the result that the belt constantly drifts from side to side laterally or "hunts." The reason for this is that most devices are initiated by a drift of the belt and continue their corrective action until the belt has returned to proper alignment. This results in the application of more corrective force than is required and the belt consequently continues to move in the direction of correction beyond the point of proper alignment and thus requires the application of a corrective force in the opposite direction.

The object of my invention is to provide a device which will automatically maintain a consveyor belt in alignment.

A further object of my invention is to provide mechanism which will maintain a conveyor belt in alignment with little or no "hunting."

A further object of my invention is to provide mechanism which will apply only sufficient corrective force to properly align the conveyor belt and will cease to apply the corrective force prior to the return of the belt to proper alignment.

Other objects and advantages will be apparent from the specification and drawings in which:

Figure 1 is a plan view of my device;

Figure 2 is a side elevation thereof;

Figure 3 is a section taken on line 3—3 of Figure 2;

Figure 4 is a sectional view taken on line 4—4 of Figure 2;

Figure 5 is a schematic diagram showing the fluid circuit employed in my device; and Figure 6 is a perspective view of a portion of the conveyor frame structure.

Conveyor frame channels 1 and 2 support a plurality of adjustable rollers 3 by means of roller hangers 4 and 5. Hangers 4 are secured directly to channel 1 and hangers 5 are slideably mounted on channel 2 by means of clips 6, secured to the hanger and to long angle iron 7 to form an inverted guide channel, as shown in Figure 4. By this arrangement it will be seen that a plurality of hangers 5 are slideably supported and guided on channel 2. Conveyor belt 8 is supported by and travels over the rollers which are spaced along the length of the conveyor sufficiently close together to prevent undue sagging of the belt. Other nonadjustable rollers (not shown) may also be provided along the conveyor and rigidly mounted in a conventional manner such as by means of hangers of the type shown at 4. These are secured directly to channels 1 and 2. In other words, only certain of the rollers are mounted for angular adjustment with respect to the conveyor through their attachment to angle iron 7.

If the movable end of a roller is shifted from a position at right angles to the conveyor channels to a position where its center line corresponds to dotted line 9—10 in Figure 1, it will urge the conveyor belt toward hangers 4. If the roller is shifted so that its center line corresponds to the dotted line 9—11, it will urge the conveyor belt laterally in the direction of hangers 5. By coupling several rollers together for simultaneous shifting in the same direction about hanger 4, the lateral shifting action on the belt is more pronounced and more positive than where a single roller is shifted. I prefer to couple two or more simultaneous shifting rollers, depending on the effort required to laterally shift the conveyor belt on the particular conveyor to which my device is to be attached. Only a portion of the upper and lower runs of the conveyor belt are shown in the drawings, inasmuch as the conveyor belt itself forms no part of my invention. This belt travels around conventional end pulleys (not shown), one of which may be suitably driven to operate the conveyor in a conventional manner.

Feeler rolls 12 and 13 are mounted on a feeler bar 16 by means of upstanding shafts 14 and 15 on which they revolve. The feeler bar is hinged to the channels 1 and 2 by means of hinge rods 17 and 18 pivoted to the feeler bar at 19 and 20 and to the channels at 21 and 22. Feeler blade 23 is angularly and adjustably mounted on the feeler bar by means of a bolt 24 extending through slot 25 in the feeler bar. A double acting air cylinder 26 is supported on channel 2 and includes a connecting rod 27 which by means of link 28 swings lever 29 about its pivot 30.

The pivot 30 is supported on channel 2 by means of a suitable mounting plate 31. The upper end 32 of lever 29 extends through a yoke 33 which is secured to angle iron 7. It will be seen that when the lever 29 is moved about its pivot 30 through the action of the double acting air cylinder angle iron 7 will be moved longitudinall of the conveyor relative to channels 2 and will carry with it one end of each the plurality of rollers 3 to change their angular relationship with respect to the conveyor.

Supply line 34 is connected to a suitable source of air under pressure and is connected to opposite ends of the cylinder 26 through three way valves 35, 36 and flow control valves 37 and 38. As best seen diagrammatically in Figure 5, valves 35 and 36 are conventional three way valves which in one position connect the cylinder to the air supply and in their other position connect the cylinder to the atmosphere. Air control valves 37 and 38 are also conventional valves which adjustably restrict the rate of flow of air to the cylinder through port 39 which may be more or less partly closed by an adjustable element 40. When air is flowing to the cylinder, check valve 41 will close and all air flowing to the cylinder must go through port 39. As soon as either valve 35 or 36 is moved to disconnect the air supply and vent the cylinder to atmosphere, the air pressure built up in the line and in the end of the cylinder being operated is immediately and quickly reduced to atmospheric pressure by flowing unrestrictedly through check valve 41 and control valve to the atmosphere. By means of this arrangement, the speed at which the connecting rod 27 moves may be adjusted by means of element 40 and when the control valve is moved to vent the cylinder to atmosphere, the immediate reduction of air pressure to atmospheric will stop the movement of the connecting rod immediately. In this way the speed of movement of the connecting rod and the extent of its movement may be precisely controlled. As stated before the three way valves, the flow control valves, and in addition, the double acting air cylinder are all commercially available conventional elements.

The three way valves are mounted on a valve plate 42 which is mounted on angle iron 7 for movement therewith. These valves are provided with operating arms 43 and 44 which are provided with operating rollers 45 and 46. Rollers 45 or 46 are selectively operated by feeler blade 23 when the feeler bar is moved laterally of the conveyor through contact of the conveyor belt with feeler rolls 12 or 13 when the conveyor shifts out of alignment.

In operation, if conveyor belt 8 shifts to the side of the conveyor opposite the valve plate, feeler blade 23 will contact valve roller 46 to operate three way valve 35 and supply air to the rear end of air cylinder 26. This will force connecting rod 27 out of the cylinder and swing lever 29 counterclockwise about its pivot 30, which through yoke 33 will shift angle 7 and the roller ends supported thereby to the left as viewed in Figure 2. This will swing the rollers to a position corresponding to the position indicated by dotted line 9—11 in Figure 1. The rollers thus shifted will urge the conveyor belt laterally toward the valve plate 42. As soon as the air cylinder operates to move angle iron 7, valve plate 42 which is mounted thereon will move to the left as viewed in Figure 1, thus moving the roller 46 out of contact with feeler blade 23 and allowing the valve to open and vent the rear end of air cylinder 26 to atmosphere, whereupon it will cease to function. Inasmuch as the drift of the conveyor back toward the valve plate to proper alignment takes a relatively long period of time after the rollers are shifted, this procedure of moving the valve plate away from the valve operating feeler blade will stop the corrective shift of the rollers 26 prior to the drift of the conveyor back to its aligned position. In other words, my device anticipates the return of the belt to its aligned position before it returns to that position. By adjusing the angularity of feeler blade 23 with respect to the feeler bar, the extent of movement of the valve plate necessary to move it out of contact with the feeler blade may be selected. The greater the angle between the feeler blade and the longitudinal axis of the feeler bar, the greater movement of valve plate will be required to move the valve away from contact with the feeler blade and the more corrective movement will be applied to the rollers by swinging them through a greater angle. I have found that in most cases an angle of about 45° with respect to the feeler bar is suitable.

It will be seen, therefore, that a slight drift of the conveyor to one side or the other will move the feeler bar a slight amount and that a slight amount of corrective movement will move the operated three way valve out of contact with the feeler blade. On the other hand, if the misalignment shift of the conveyor is extensive or rapid, the movement of the feeler bar will be greater and it will require a greater corrective shift of angle iron 7 and the associated roll ends to move the operated three way valve out of contact with the feeler blade. Additional control of my device is obtained by adjusting the speed of operation of the cylinder by means of elements 40. It will be clear, therefore, that the operation of my device automatically compensates for the degree of misalignment by applying a greater corrective movement for a major misalignment and a small degree of corrective movement for a minor misalignment. The movement of the valve plate and the valve supported thereby out of contact with the feeler blade operates to discontinue corrective movement of the roller ends before the conveyor belt has time to shift back to its normal path of travel. By this arrangement of making a corrective movement in proportion to the degree of misalignment and anticipating realignment and disconnecting the operating mechanism prior to the completion of the alignment drift of the conveyor prevents overcorrection and "hunting" of the conveyor belt. The corrective force applied by the shifted rollers will on each shift re-establish a state of equilibrium with the conveyor belt properly tracking.

While I have disclosed as my preferred embodiment a mechanism employing an air motor for operating the longitudinally shiftable member, it is obvious that other types of motors either hydraulic or electric could be substituted. The type of motor will, of course, determine the type of motor controls used. Whether these are switches for operating an electric motor or hydraulic valves for a hydraulic motor, they would be arranged in the same relative manner for operation by the feeler bar or control operating means 16 as the air valves shown in my preferred embodiment. Other obvious modifications could be made in my device without departing from the scope and spirit of my invention.

I claim:

1. In a belt conveyor, a longitudinally shiftable member supporting one end of a plurality of belt supporting rollers, a double acting fluid motor connected to the shiftable member, a valve for controlling operation of the motor in one direction, a valve for controlling operation in the opposite direction, both valves being mounted on the shiftable member in opposed relationship, valve operating means mounted adjacent the conveyor belt for movement thereby when the belt shifts out of alignment and an angularly adjustable feeler blade angularly mounted on said operating means in a position to operate one or the other of said valves depending on the direction of misalignment.

2. In a belt conveyor, a longitudinally movable member, a plurality of rollers having one of their ends mounted thereon, a reversible motor for shifting the movable member in either direction, a pair of motor controls mounted on and movable with said movable member, one of said controls operating the motor in one direction and the other operating it in the opposite direction, control operating means movable laterally of the conveyor by the belt when the latter shifts out of alignment and an angularly adjustable feeler blade angularly mounted on said control operating means for contacting one or the other of said motor controls depending on the direction of movement of the control operating means.

References Cited in the file of this patent

UNITED STATES PATENTS

| | | |
|---|---|---|
| 1,066,687 | Warren | July 8, 1913 |
| 2,076,413 | Ostertag | Apr. 6, 1937 |